Aug. 28, 1951        W. L. AMES        2,565,465
APPARATUS FOR MANUFACTURING RETRACTILE CORDS
Filed May 6, 1949        6 Sheets-Sheet 1
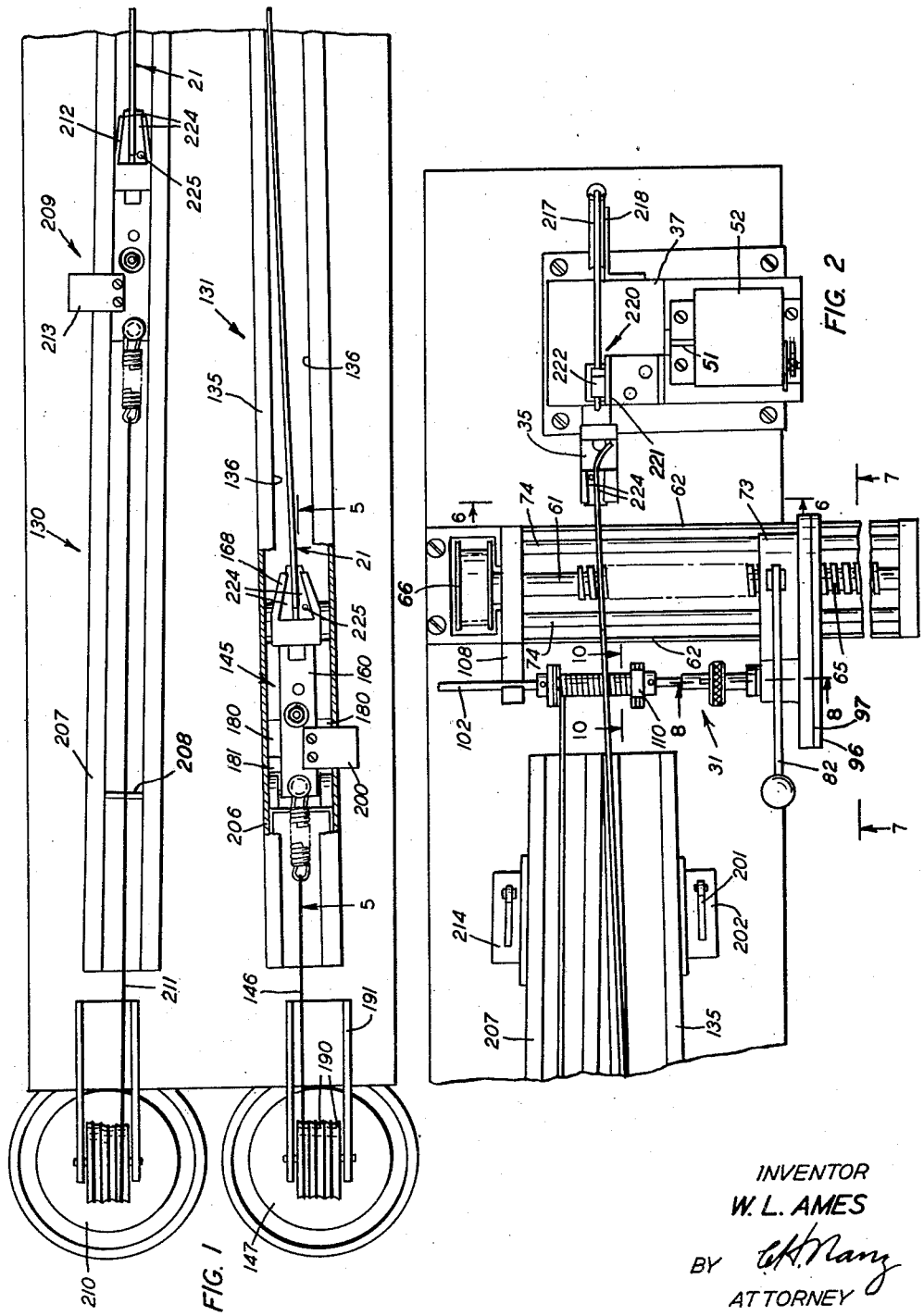
INVENTOR
W. L. AMES
BY
ATTORNEY Aug. 28, 1951 W. L. AMES 2,565,465
APPARATUS FOR MANUFACTURING RETRACTILE CORDS
Filed May 6, 1949 6 Sheets-Sheet 2
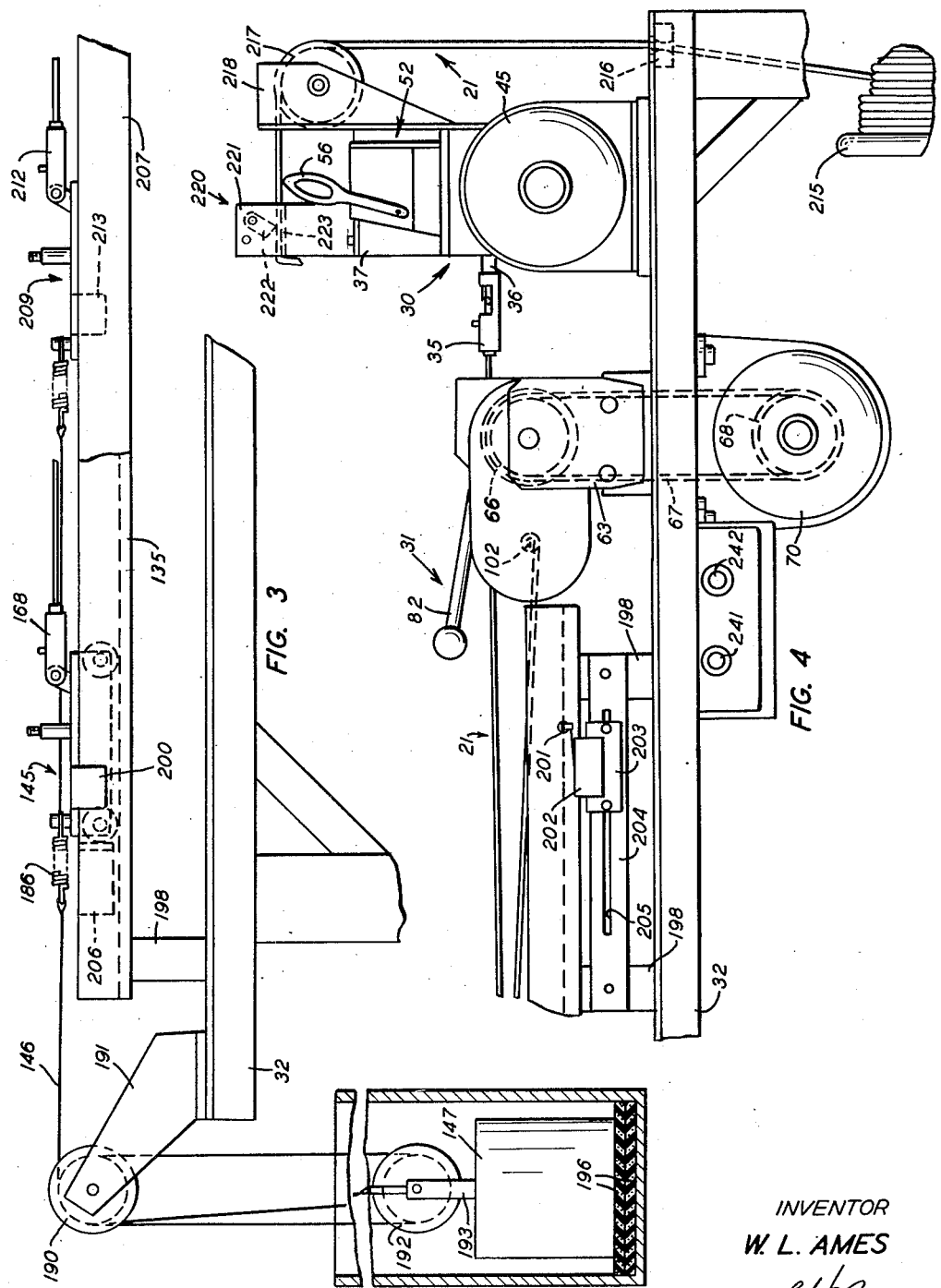
INVENTOR
W. L. AMES
BY [signature]
ATTORNEY

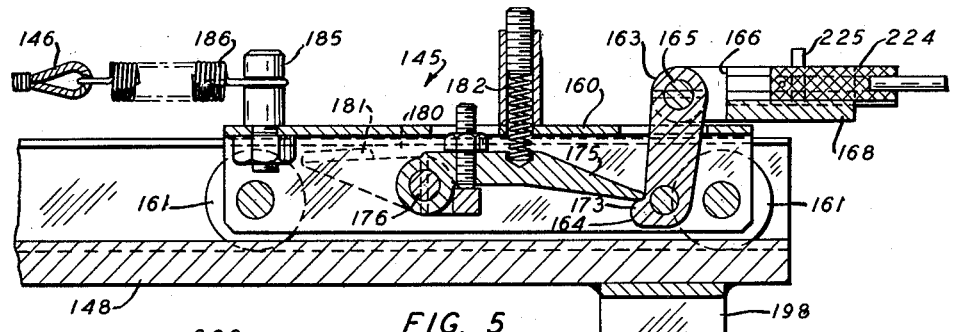
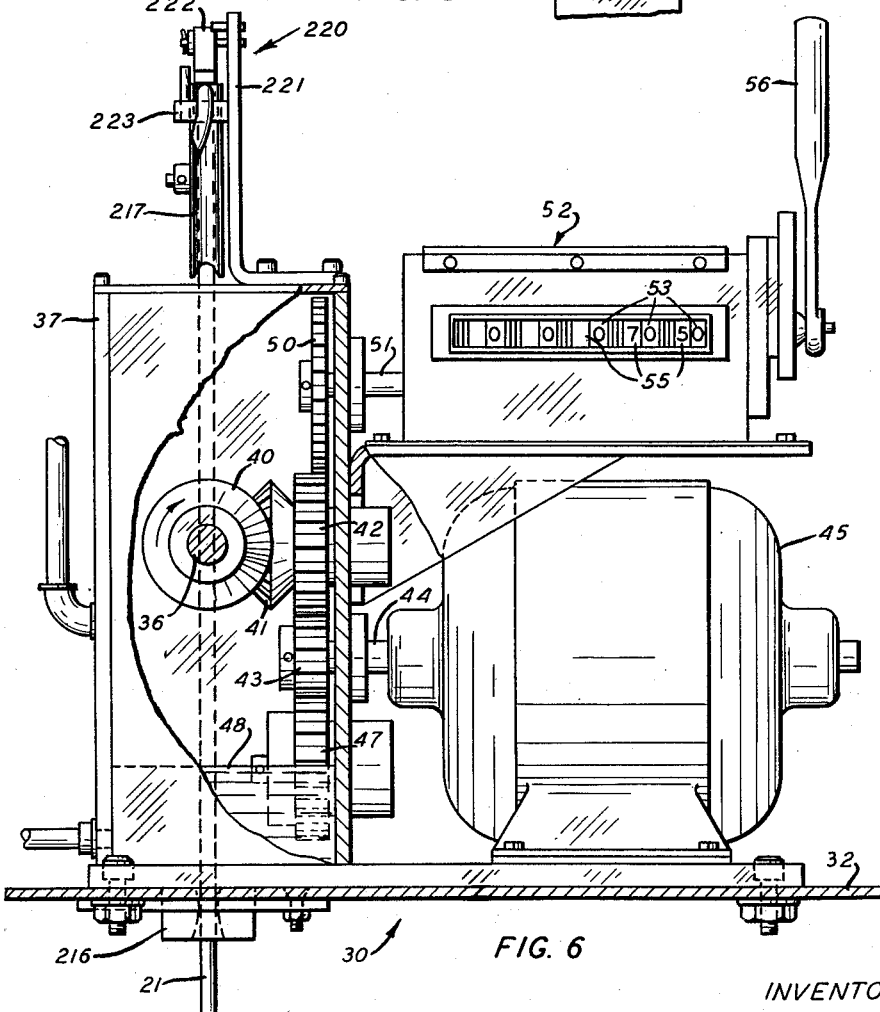

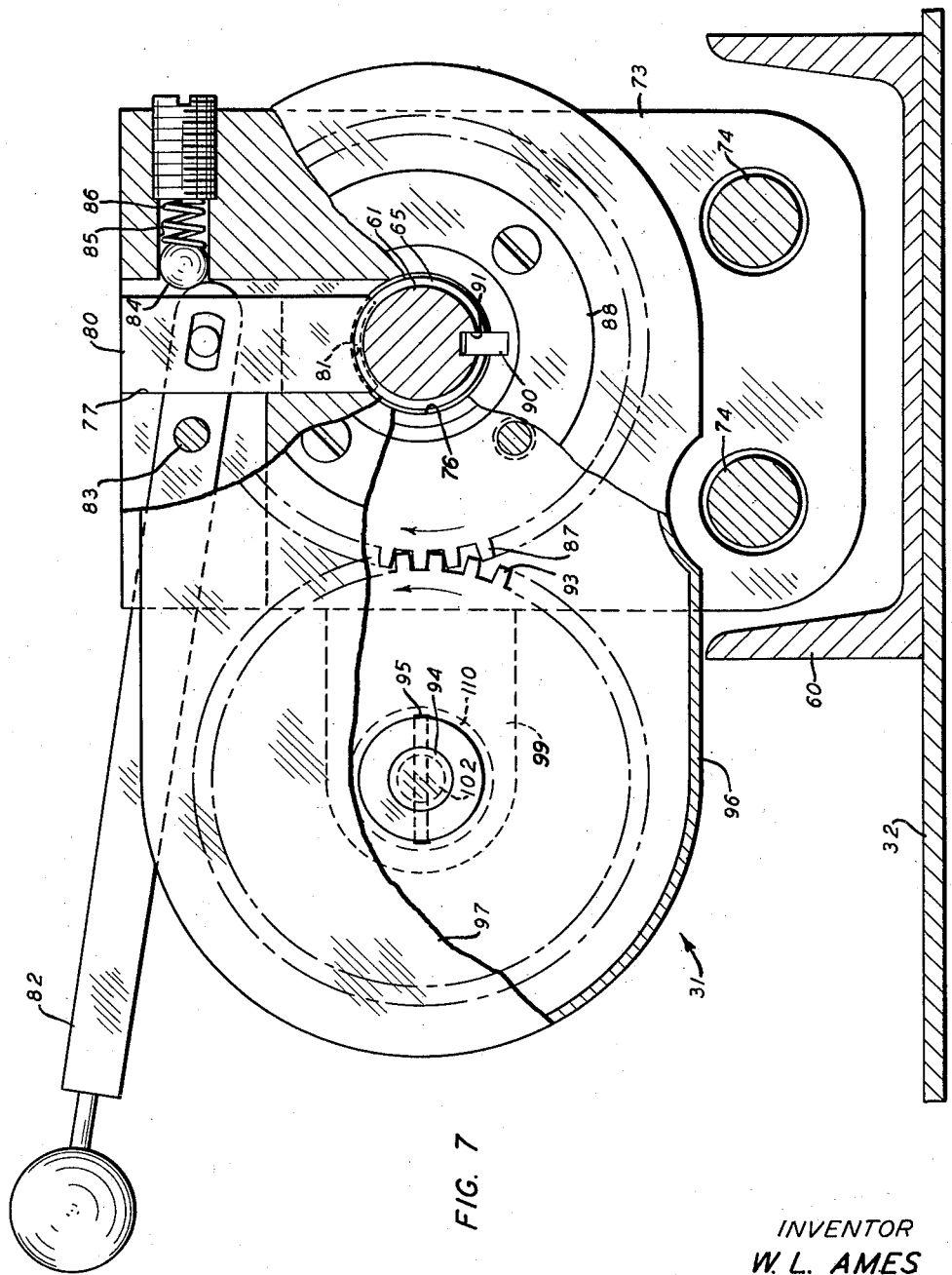

Aug. 28, 1951 W. L. AMES 2,565,465
APPARATUS FOR MANUFACTURING RETRACTILE CORDS
Filed May 6, 1949 6 Sheets-Sheet 5
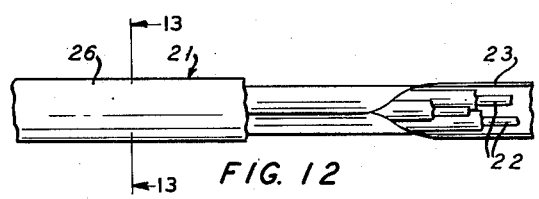
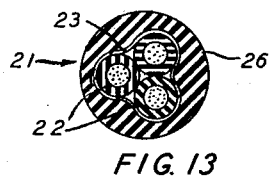
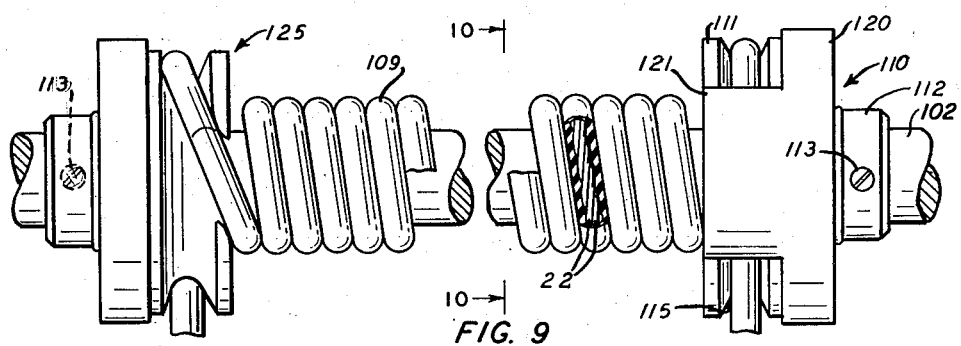
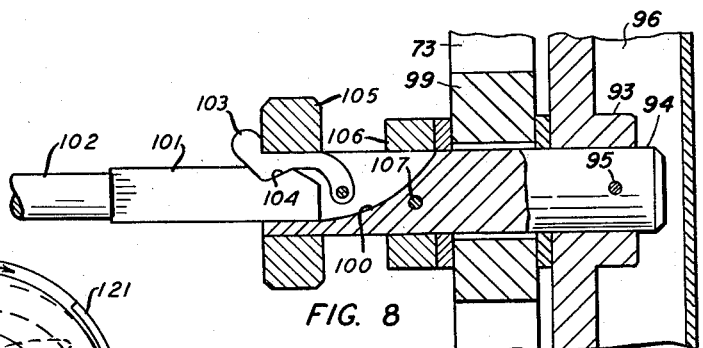
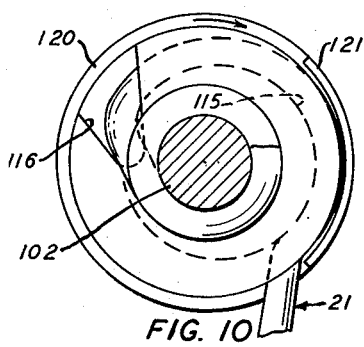
INVENTOR
W. L. AMES
BY
ATTORNEY

INVENTOR
W. L. AMES
BY
ATTORNEY

Patented Aug. 28, 1951

2,565,465

UNITED STATES PATENT OFFICE 2,565,465

APPARATUS FOR MANUFACTURING RETRACTILE CORDS

William L. Ames, Baltimore, Md., assignor to Western Electric Company, Incorporated, New York, N. Y., a corporation of New York Application May 6, 1949, Serial No. 91,749

9 Claims. (Cl. 18—19)

1

This invention relates to apparatus for manufacturing retractile cords, and more particularly to apparatus for forming jacketed cordage into helically coiled, retractile cords.

In the telephone and other arts, it is frequently desirable to connect electrically-operated devices by a compact helically coiled, extensible cord the length of which may be extended by slight tension and which returns to its compact form when the tension is released.

An object of the invention is to provide new and improved apparatus for making retractile cords.

Another object of the invention is to provide new and improved apparatus for sequentially twisting and winding a length of jacketed cordage into a compact helix in such a manner that the twist introduced in the cordage tends to force the helical coils of the helix tightly against each other.

The present invention contemplates the forming of retractile cords from cordage having a vulcanized jacket. One method illustrating certain features of the invention comprises sequentially imparting a predetermined twist to a given length of such cordage, winding the previously twisted cordage into a compact helix, and subjecting the twisted, helically wound cordage to sufficient heat to set the jacket in its twisted, helical form.

One type of apparatus embodying certain features of the invention for forming retractile cords from jacketed cordage, comprises means for imparting a predetermined twist to a given length of rubber covered cordage, means for winding the twisted length of cordage into a compact helix, and means for holding the helically wound cordage on the winding means so that the rubber jacket of the cordage may be heated to set it in its twisted, helical form.

A clear understanding of the invention will be had from the following detailed description of a specific embodiment thereof, when read in conjunction with the appended drawings, in which:

Fig. 1 is a top plan view of a portion of a twisting and winding apparatus embodying certain features of the invention;

Fig. 2 is a top plan view of a portion of the apparatus extending to the right of the apparatus shown in Fig. 1;

Fig. 3 is a front elevation of the portion of the apparatus shown in Fig. 1;

Fig. 4 is a front elevation of the portion of the apparatus shown in Fig. 2;

2

Figure 14:
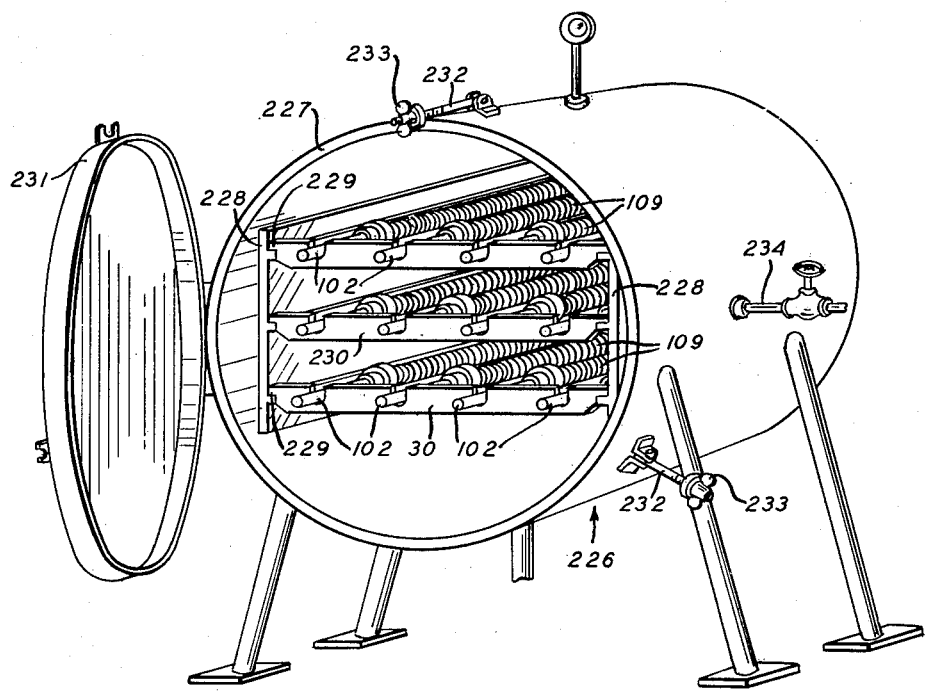
Figure 15:
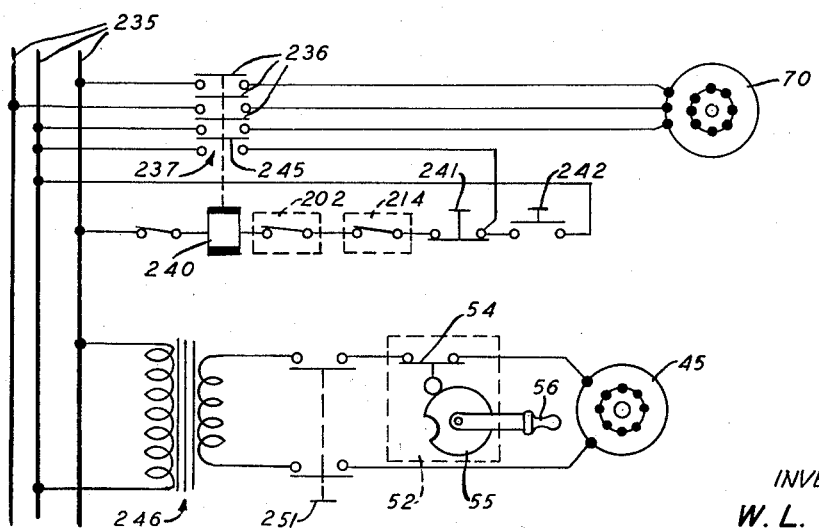

Fig. 5 is a fragmentary, vertical sectional view taken along line 5—5 of Fig. 1;

Fig. 6 is a vertical sectional view taken along line 6—6 of Fig. 2;

Fig. 7 is a vertical sectional view taken along line 7—7 of Fig. 2 with portions thereof broken away for reasons of clarity;

Fig. 8 is a fragmentary, vertical sectional view taken along line 8—8 of Fig. 2;

Fig. 9 is an enlarged, fragmentary plan view showing a portion of the apparatus shown in Fig. 2;

Fig. 10 is a vertical sectional view taken along line 10—10 of Fig. 9;

Fig. 11 shows a complete reactile cord that may be made by use of the apparatus and by practicing methods embodying the invention;

Fig. 12 is an enlarged, fragmentary view of a portion of the type of cordage used in forming the retractile cord shown in Fig. 11;

Fig. 13 is a vertical sectional view taken along line 13—13 of Fig. 12;

Fig. 14 illustrates an oven in which the helically wound cord may be subjected to heat treatment, and Fig. 15 is a schematic wiring diagram of a control circuit for the motors operating the twisting and winding apparatus.

Referring now to the drawings and more particularly to Fig. 11, there is shown a complete retractile cord, indicated generally by the numeral 20, having a compact helical section 19. The helical section 19 is formed by twisting and subsequently winding a predetermined length of jacketed cordage, indicated generally by the numeral 21, in a compact helix and then subjecting it to sufficient heat to set the cordage 21 in its twisted, helical shape. The jacketed cordage, as shown in Figs. 12 and 13, consists of a plurality of individually insulated conductors 22—22, preferably tinsel conductors, positioned parallel to each other and enclosed in a paper tape 23 formed longitudinally around the parallel conductors. The paper covered core is enclosed in a tough elastic jacket 26 formed from neoprene (polychloroprene) compound, or from a rubber or rubber-like compound which is extruded over the paper covered core and thereafter vulcanized or cured by appropriate heat treatment. Each end of the retractile cord has a portion of the jacket 26 stripped from the conductors 22—22 and a solderless terminal 27 is secured on the end of each of the conductors 22—22. A stay band 28 is formed around each end of the retractile cord 20 at the extremities of the jacket 26.

The rubber covered cordage 21 may be fabricated without enclosing the conductors 22—22 in a paper tape 23, or the paper tape may be served spirally around the conductors rather than formed longitudinally of the parallel conductors. While the best results are obtained when the conductors are laid parallel when the cordage is formed, the individual conductors 22—22 may be twisted to form a composite core before the jacket 26 is extruded thereover and vulcanized. A more detailed description of the various types of cordage which may be formed into retractile cords appears in a copending application Serial No. 91,738, filed May 6, 1949, by T. E. Cox and F. P. Lyons for "Retractile Cords and Methods of Making Them."

One type of apparatus for forming the helical portion 19 of the retractile cord 20 (Fig. 11), is shown in Figs. 1 to 10, inclusive, of the drawings. This apparatus comprises a twisting device indicated generally by the numeral 30 (Fig. 1), and a winding device indicated generally by the numeral 31, which devices are mounted on a table indicated by the numeral 32. The twisting device 30, as shown in Figs. 2, 4 and 6, comprises a chuck 35 (Fig. 2) designed to grip an end of the cordage 21. The chuck 35 is secured to a shaft 36 which is suitably journalled in a housing 37, and has a bevelled gear 40 (Fig. 6) secured thereon, engaging another bevelled gear 41 journalled in the housing 37. A gear 42 is secured on the gear 41 for rotation therewith and meshes with a pinion 43 secured on the end of a shaft 44 provided on a motor 45 mounted on the table 32 adjacent to the housing 37. The pinion 43 also engages an idler gear 47, which is journalled in the housing 37 and runs in a reservoir of oil indicated by the numeral 48, whereby the gear 47 carries a lubricating oil to the gear and pinion 42 and 43, respectively. When the motor 45 is energized, the pinion 43 drives the gear 42 in a direction which causes the bevelled gear 41 to rotate in a clockwise direction as indicated by the arrow in Fig. 6. Consequently, the shaft 36 and the chuck 35 secured thereto are driven in a clockwise direction, when viewed in Fig. 6.

The gear 42, which is driven by the pinion 43, in turn drives a gear 50 mounted on the end of a shaft 51 forming part of a counter indicated generally at 52. The shaft 51 is arranged to drive counting wheels 53—53 of the counter 42 so as to register the number of revolutions of the chuck 35 secured on the shaft 36. The counter 52 also is provided with indexing wheels 55—55, which may be set to cause the operation of a sensitive switch 54, which is connected as shown in the wiring diagram (Fig. 15), for terminating the operation of the motor 45 when the chuck 35 has made a predetermined number of revolutions. The counter 52 is provided with a reset lever 56, which, when actuated, serves to reset the counting wheels 53—53 and the indexing wheels 55—55 to their normal starting position in which the "0" digit of each counting wheel is opposite the window of the counter while the indexing wheels register the number of revolutions desired by the chuck 35. When the counting wheels and indexing wheels are in their respective starting positions, the switch 54 is closed and remains closed until the counter registers the number of revolutions determined by the initial setting of the indexing wheels 55—55. At this point, the switch 54 drops open and remains open until the counting and indexing wheels are reset to their respective starting positions by the reset lever.

The winding device 31 consists of a channel-shaped base 60 secured to the table 32 in a position at right angles to the rotating axis of the twisting head 35. A shaft 61 is suitably journalled in a support 62 secured to the channel 60 adjacent to the chuck 35, and a plate 63 is secured at the opposite end of the channel 60. A substantial portion of the shaft 61 positioned between the supports 62 and 63 is provided with a conventional square thread indicated by the numeral 65. One end of the shaft 61 extends through the support 62 and has a pulley 66 secured thereon, which engages a belt 67 (Fig. 4) driven by a pulley 68 provided on the shaft of a motor 70 secured to the under side of the table 32 (Fig. 4). A plate 73 is mounted slidably in an upright position on parallel rods 74—74 secured at their oppoiste end in the supports 62 and 63. The plate 73 is provided with a bore 76, which is of such size that it clears the threaded portion 65 of the shaft 61.

The plate 73 is provided with a slot 77 extending from the top of the plate to the internal bore 76 and is designed to slidably receive a follower 80 (Fig. 7). The follower 80 has an arcuate end 81 formed thereon, which is provided with a plurality of teeth adapted to engage the thread 65 of the shaft 61. The follower 80 is arranged to be disengaged from the thread 65 of the shaft 61 by a lever 82, which is pivotally mounted on the plate 73 by means of a pin 83. When the lever 82 is moved downwardly the end thereof connected to the follower 80 moves upwardly and withdraws the arcuate end 81 of the follower from the thread 65.

A ball 84 is maintained in the end of a bore 85 provided in the plate 73 by a spring 86, and is so arranged that a portion of the ball extends into the slot 77 and engaged the rounded end of the lever 82. This arrangement of the ball 84 and the spring 86 serves to maintain the lever in the position shown on the drawing, that is, maintains the lever so that the follower is resiliently maintained in engagement with the thread 65 of the shaft 61. When the lever 82 is actuated to disengage the arcuate end of the follower 80 from the thread 65, the ball 84 moves inwardly in the bore 85 until the center of the end of the lever 82 passes beyond the center of the ball, whereupon the spring and ball then tend to hold the lever 82 in such a position that the end of the follower 80 is disengaged from the thread 65.

A gear 87 is suitably journalled in the plate 73 concentrically with the central axis of the shaft 61 and has an annular member 88 secured thereto. The annular member is provided with a key 90, which is rigidly secured to the annular member and slidably engages a keyway 91 provided in the threaded portion of the shaft 61. When the shaft 61 is rotated in the proper direction by the motor 70, it drives the gear 87 in a clockwise direction through the annular member 88. The gear 87 engages a gear 93 secured on the end of a shaft 94 by means of a pin 95, the shaft 94 being suitably journalled in an ear 99 provided on the plate 73. The gears 87 and 93 are enclosed in a housing 96 provided with a cover 97. Portions of the cover 97 are broken away in Fig. 7 in order to illustrate the arrangement and operation of the follower 80, and the gears 87 and 93.

The portion of the shaft 94 (Figs. 2 and 8) extending beyond the ear 99 is provided with a slot 100 adapted to slidably receive the end of a rectantgular bar 101 secured on the end of a rodlike mandrel 102. A lever 103 is mounted pivotally on the end of the shaft 94 between the sides of the slot 100, and is adapted to engage a recess 104 provided in the end of the plate 101. A ring 105 is slidably positioned on the end of the shaft 94 for the purpose of holding the lever 103 in engagement with the recess 104 of the plate 101. This arrangement of the lever 103 and the ring 105 provide a quick means for connecting the end of a mandrel 102 to the shaft 94 and for removing it therefrom. Lateral movement of the shaft 94 is prevented by a collar 106 pinned to the shaft 94 by a pin 107 so that it abuts the ear 99, and the gear 93 secured to the shaft on the opposite side of the ear (Fig. 8).

When the shaft 61 (Fig. 7) is driven by the motor 70, it drives the gear 87 in a clockwise direction. In turn, the gear 87 rotates the gear 93 and the shaft 94 secured thereto in a counterclockwise direction. The shaft 94, in turn, rotates the mandrel 102 in a counterclockwise direction when viewed in Fig. 7. The support 62 secured to the channel 60 is provided with a projection 108 for supporting the mandrel during rotation. When the shaft 61 is driven by the motor and the follower 80 is in engagement with the thread 65 of the shaft, the plate 73 moves away from its starting position adjacent to the support 62 at a constant rate of speed determined by the pitch of the thread 65. As the plate is moved in this direction by the threaded portion of the shaft 61, the gears 87 and 93 are driven by the shaft as described hereinabove to rotate the mandrel 102.

The mandrel 102, when rotated as described, is designed to wind a length of cordage 21 previously twisted by the twisting device 30 into a compact helix 109, as shown in Fig. 9, to form the helical portion 19 of the retractile cord 20 (Fig. 11). In order for the mandrel to wind the cordage thereon when it is rotated, a clamp indicated generally at 110 is secured on the mandrel near the right-hand end thereof for receiving the beginning end of a length of cordage 21 to be formed into the retractile cord 20.

The clamp 110 comprises an annular member 111 having a hub 112 formed thereon, which is provided with a set screw 113 by means of which the clamp may be secured in a desired position on the mandrel 102. The annular member 111 is provided with a peripheral groove 115, which is cut therein so as to be positioned eccentrically with respect to the axis of the clamp 110 and the mandrel 102. The left-hand face of the annular member 111 (Fig. 10) is provided with a slot 116 through which the cordage passes from the under side of the mandrel to the peripheral groove 115. A ring 120 is mounted rotatably on the hub 112 of the clamp, and is provided with an arcuate projection 121, extending across the groove 115 and slidably engages the periphery of the annular member. The ring 120 is rotated in the direction indicated by the arrow in Fig. 10, to move the projection 121 over the shallow portion of the peripheral groove 115 and clamp the end of the cordage 21 tightly between the bottom of the groove and the projection 121 (Fig. 10). The clamp is so designed that the cordage passes from the peripheral groove 115 through the left-hand face of the annular member 111 substantially tangent to the under side of the mandrel 102, when viewed in Figs. 2, 9 and 10.

A second clamp 125 is positioned on the mandrel 102 for the purpose of clamping the left end of the completed helix 109 on the mandrel 102.

The clamp 125 is identical in construction and operation with that described for the clamp 110 and is positioned on the mandrel so that the slot therein is adjacent to the end of the helix 109. The clamp 110 is secured on the mandrel and remains in a fixed position thereon with respect to the right end of the mandrel. The clamp 125 is not fastened to the mandrel at the beginning of the winding operation but remains loose thereon so that the mandrel 102 may slide therethrough as the cordage 21 is wound on the mandrel.

The twisting device 30 and the winding device 31 operate in conjunction with tensioning devices indicated generally at 130 and 131 (Figs. 1 and 5). Since the tensioning devices 130 and 131 are identical in construction and operation, only the tensioning device 131 and its mode of operation will be described in detail.

The tensioning device 131 includes an elongated channel-shaped track 135 having inwardly extending flanges 136—136, and a carriage indicated generally at 145 positioned movably in the track 135 and connected to a weight 147 by a steel cable 146 (Fig. 1). The carriage 145, as shown in detail in Fig. 5, comprises a channel-shaped body 160 having wheels 161—161 provided thereon for free movement within the track 146. A lever 163 is pivotally mounted at the lower end thereof on a pin 164 secured in the side walls of the body 160, and the opposite end thereof is pivotally mounted in a bifurcated end 166 of a chuck 168 by a pin 165. The chuck 168 is designed to grip an end of the cordage 21 in a manner hereinafter to be described. The lever 163 is provided with a shoulder 173 adjacent to the lower end thereof, which engages the end of a lever 175 secured on a pin 176 suitably journalled in the side walls of the body 160. The ends of the pin 176 extend beyond the side walls of the body 160, and levers 180—180 are secured thereon for movement therewith. Each of the levers 180—180 is provided with a brake shoe 181 of a suitable friction material, which is normally positioned slightly beneath the under side of the flanges 136—136 of the track 135. A spring 182 is arranged to urge the right-hand end of the lever 175 (Fig. 5) downwardly, and turn the pin 176 so that the brake shoes 181—181 engage the under surface of the flanges of the track and prevent the carriage from moving in the track 135. When the lever 163 is pivoted about the pin 164 in a clockwise direction, the shoulder 173 raises the right-hand end of the lever 175 and thereby disengages the shoes 181—181 from the flanges 136—136.

A post 185 (Fig. 5) is secured to the end of the body 160, and receives one end of a tension spring 186, the other end of which spring is connected to one end of the cable 146. The cable 146 extends from the spring 186, and passes alternately around a group of pulleys 190—190 mounted on a bracket 191 and a group of pulleys 192—192 mounted on a bracket 193 secured to the weight 147, with the other end thereof secured to the bracket 193. The weight 147 thus connected to the carriage 145 urges the carriage toward the left end of its track, when viewed in Figs. 1 and 3. The system of pulleys 190—190 and 192—192 is provided between the weight 147 and the carriage 145 so that the weight travels a substantially shorter distance vertically than the distance the carriage 145 travels from the right-hand end to the left-hand end of its track 135. The weight 147 is positioned in a cylindrical housing 195 suitably mounted on the floor supporting the table 32, and rubber pads 196—196 are positioned at the bottom of the housing 195 to cushion the impact of the weight as it strikes the bottom of the housing.

The track 135 of the tensioning device 131 is secured to the top of the table 32 by supports 198—198 (Fig. 4), which elevate the track so that the chuck 168 provided on the carriage 145 is aligned horizontally with the winding axis of the mandrel 102. The carriage 145 is provided with a plate 200 designed to actuate a lever 201 of a sensitive switch 202 positioned near the right-hand end of its track (Figs. 2 and 4). The switch 202 is mounted on a plate 203, which is positioned adjustably on a support 204 by means of a slot 205. The sensitive switch 202 is located near the end of the track 135 adjacent to the winding device 31 for the purpose of terminating the operation of the winding motor 70 when the carriage 145 reaches a point near the right-hand end of the track. The track 135 is provided with a stop 206 positioned adjustably therein adjacent to the left-hand end of the track, when viewed in Figs. 1 and 3, which serves to limit the travel of the carriage 145 in that direction that may be effected by the weight 147.

The tensioning device 130 includes an elongated track 207 (Figs. 1 and 2) mounted on the table 32 as described for the track 135 and having a stop 208, and a carriage indicated generally at 209 movably positioned in the track and connected to a weight 210 by a steel cable 211 in the manner described for the carriage 145. The carriage 209 is provided with a chuck 212 designed to grip an end of the cordage 21 and a plate 213 adapted to operate a sensitive switch 214 positioned near the end of the track 207 adjacent to the winding device 31.

A supply of the cordage 21 is provided on a reel 215 (Fig. 4), which may be mounted rotatably in a suitable manner under the table 32. The cordage 21 is withdrawn from the reel 215, and passes through a bell-shaped aperture provided in a guide member 216 secured to the table 32. The cordage passes upwardly and around a pulley 217 mounted on a bracket 218 secured on the housing 37 to a clamp indicated generally at 220. The clamp 220 consists of a support 221 secured on top of the housing 37 and having a catch 222 pivotally mounted thereon above a plate 223. The cordage 21 passes between the free end of the catch 222 and the plate 223, and in so doing moves the free end of the catch 222 to the left so that the catch is positioned angularly on the support 221. This position of the catch permits free movement of the cordage between the end of the arm 222 and the plate 223 from right to left, when viewed in Fig. 4, but the weight of the catch and the angle at which it rests on the cordage prevents movement of the cordage from left to right. This arrangement of the clamp serves to maintain an end of the cordage 21 available so that it may be clamped in the chuck 168 of the tensioning device 131.

The chuck 35 of the twisting device 30, and the chucks 168 and 212 provided on the carriages 145 and 209, respectively, are identical in construction and operation. Hence, only the chuck 168 provided on the carriage 145 will be described in detail. The chuck 168 is provided with a pair of tapered jaws 224—224 (Fig. 1), positioned slidably in the chuck so that the end of the cordage 21 may be positioned therebetween. The side walls of the chuck are tapered inwardly towards the free end of the chuck, whereby movement of the jaws toward the free end of the chuck causes the adjacent faces of the jaws to move closer together and to grip the cordage positioned therebetween. The adjacent surfaces of the jaws 224—224 are knurled to prevent the cordage from slipping out of the chuck. A pin 225 is provided on one of the jaws 224 to facilitate positioning the jaws within the chuck 168 so that the end of the cordage 21 may be inserted between the jaws, and to move the jaws so the end of the cordage may be removed from the chuck, when desired.

The end of the cordage 21 is inserted into the chuck 168 while the carriage 145 is held at the right end of the track 135 by the pressure of the brake shoes 181—181 against the flanges 136—136. The connection of the cordage in the chuck actuates the lever 175 and disengages the brake shoes 181—181, from the flanges and allows the carriage to travel to the left against the stop 206. The travel of the carriage 145 to the left withdraws the cordage from the reel 215, and in so doing measures the length of the cordage 21 required for a retractile cord, like the retractile cord 20 (Fig. 11). The cordage 21 is cut near the clamp 220 to provide a length of cordage, and the free end of the length is inserted between the jaws of the chuck 35. The tension exerted on the length of cordage by the weight 147 causes the jaws of the chucks 35 and 168 to grip the end of the cordage tightly between the knurled surfaces thereof.

When the chuck has been rotated in a clockwise direction (Fig. 6), the desired number of times determined by the counter 52 to twist the length of cordage between the chucks 35 and 168, the end of the cordage gripped by the chuck 35 is removed therefrom, and is inserted in the clamp 110 secured on the mandrel 102. The mandrel is rotated as described to wind the twisted length of cordage on the mandrel in the compact right-hand helix 109. The weight 147 connected to the carriage 145, keeps the cordage in a straight line between the chucks 35 and 168 while the cordage is twisted by the chuck 35, and between the chuck 168 and the clamp 110 while the twisted cordage is wound on the mandrel 102.

In Fig. 14, there is illustrated an autoclave, indicated generally by the numeral 226, which may be of any conventional design. As shown, the autoclave includes a cylindrical housing 227 provided with wall plates 228—228 having juxtaposed grooves provided therein for receiving projections 229—229 provided on racks 230—230. The racks 230—230 are designed to receive a plurality of mandrels 102—102, each mandrel having a compact helix 109 of the cordage 21 wound thereon and clamped in its compact helical position by the clamps 110 and 125. The housing 226 is provided with a hingedly mounted door 231 which is arranged to be clamped in its closed position by a plurality of hingedly mounted bolts 232—232 provided with suitable wing nuts 233—233.

When the door 231 is in its closed position, steam under a desired pressure is admitted into the housing 226 by means of a pipe 234 connected to a suitable steam supply (not shown). The lengths of cordage wound on the mandrels positioned in the autoclave are subjected to heat therein sufficient to relieve substantially all the stresses set up in the cordage resulting from winding it helically on the mandrel, but to relieve only a portion of the torsional stress set up in the cordage by twisting it in the manner described. As a result, the heat sets the jackets of the lengths of cordage in their twisted, helical shapes on the mandrels, whereby each jacket retains the cordage in its helical shape, substantially like that of the retractile cord 20 (Fig. 11), after it is removed from the mandrel. If desired, the autoclave 226 may be replaced by an electrically heated oven, or the like, of conventional design.

A typical electrical circuit for controlling the operation of the twisting motor 45 and the coiling motor 70 is shown in Fig. 15. A suitable source of three-phase, A. C. potential may be connected to terminals 235—235, which are connected directly to the motor 70 in series with a plurality of normally open contacts 236—236 provided on a relay indicated generally at 237. The relay 237 is provided with an operating coil 240, which is connected across a single phase of the three-phase supply connected to the terminals 235—235 in series with the normally closed contacts of the sensitive switches 202 and 214, a normally closed "stop" push button contact 341 and a normally open "start" push button contact 242. The motor 70 is energized by operation of the "start" push button 242 which energizes the relay 237 to close the contacts 236—236. The relay 237 is provided with a normally open auxiliary contact 245 for the purpose of bridging the "start" button and thereby holding the coil on its energized state when the "start" button is released. When either of the normally closed contacts of the switches 202 and 214 are opened by the movement of the carriages 145 and 209, respectively, the relay 237 is deenergized which terminates the operation of the motor 70.

The twisting motor 45 receives its potential from a transformer 246 having its primary winding connected directly across one phase of the three-phase supply connected to the terminals 235—235. The transformer 246 steps down the potential supplied to the terminals 235—235 to that required to operate the motor 45. The motor 45 is connected across the primary winding of the transformer in series with the contact 54 provided in the counter 52, and the normally open contacts of a two-pole safety switch 251 which normally is maintained in its actuated position. The contact 54 is arranged to be actuated by the indexing wheels 55—55, one of which is illustrated schematically in Fig. 15. When the counting wheels 53—53 and the indexing wheels are positioned in their normal starting position with respect to each other by the reset lever 56, the switch 54 is closed, whereby the motor 45 is energized and rotates the chuck 35 in the manner described hereinabove. When the counting wheels indicate that the chuck has made the number of revolutions initially set on the indexing wheels 55—55, the indexing wheels have been advanced until the "0" digits thereof are positioned directly opposite the window of the counter, in which case, the switch 54 drops open and disconnects the motor 45 from the circuit thereby terminating the rotation of the chuck 35.

Operation

The above-described apparatus operates in the following manner to form lengths of jacketed cordage, like the cordage 21, into helically wound retractile cords like that shown in Fig. 11.

Let it be assumed that a reel 215 containing a supply of the rubber jacketed cordage 21 has been positioned under the table 32 and the end thereof has been passed through the bushing 216, around the pulley 217 and between the catch 222 and the plate 223 of the clamp 220. Let it further be assumed that the index wheels 55—55 of the counter 52 are set to control the motor 45 so that it will rotate the chuck 35 the number of revolutions corresponding to the number of twists required in a given length of the cordage 21. The indexing wheels are so positioned that the "0" digit of each wheel is directly opposite the window of the counter. This position of the indexing wheels opens the switch 54 (Fig. 15) provided in the counter whereupon the motor 45 is not energized.

Assuming that the carriage 145 is positioned at the right-hand end of its track, the end of the cordage 21 is inserted between the jaws 224—224 (Fig. 1) of the chuck 168 provided on the carriage 145. The weight 147 attached to the carriage 145 tends to pull the carriage to the left. Since the cordage 21 is connected to the chuck 168, the weight creates sufficient tension in the cordage to pull the lever 163 in a clockwise direction about the pin 164 and to raise the end of the lever 175 so as to disengage the brake shoes 181—181 from the track 135. The weight 147 then draws the carriage 145 to the left, until the carriage finally engages the stop 206 which is positioned in the track. This movement of the carriage 145 withdraws the cordage 21 from the reel 215 and in so doing measures out a length of cordage required to make a retractile cord.

When the carriage 145 reaches the stop 206, the cordage is severed at a point adjacent to the clamp 220, and the end thereof is inserted between the jaws 224—224 of the chuck 35 of the twisting device 30. The end of the cordage 21 is pushed into the chuck 35 until the cordage is taut between the chuck 35 and the chuck 168. When the carriage 145 is in this position, the weight 147 exerts tension on the length of cordage 21 secured between the chucks 35 and 168.

After the length of cordage 21 is stretched between the chuck 168 and the chuck 35, the reset lever 56 of the counter 52 is actuated to reset the counting wheels 53—53 and the indexing wheels to their starting position, in which position the index wheels close the switch 54, which connects the motor 45 across the primary winding of the transformer 246. The motor is energized and rotates the chuck 35 in a clockwise direction as indicated by the arrow in Fig. 6 of the drawing. The rotation of the chuck 35 in this direction, twists the length of cordage held between the chuck 35 and the chuck 168, whereby the parallel conductors 22—22 are twisted about each other in a long-lay, right-hand spiral, as shown in Fig. 9 of the drawings.

The motor 45 continues to rotate the chuck 35 and to twist the cordage 21 until the counting wheels 53—53 indicate that the chuck 35 has been rotated the number of revolutions initially set on the indexing wheels 55—55. When the counting wheels reach this point, the switch 54 drops open and disconnects the motor 45 from the transformer 246 and thereby terminates the twisting operation of the cordage 21.

During the twisting operation on the length of cordage, the weight 147, connected to the carriage 145, holds the cordage taut in spite of the fact that the cordage is being twisted. When the twisting operation terminates, the weight 147 continues to hold the cordage taut and prevent the twist from forming kinks in the length of cordage. During the twisting operation, the twist imparted to the cordage shortens the cordage somewhat and withdraws the carriage slightly from the stop 206.

The amount of longitudinal twist needed in a given length of cordage depends upon various factors, such as the internal structure of the cord, that is, the manner in which the conductors 22—22 are formed into a composite core before the jacket 26 is supplied thereover, the age of the jacket on the cordage, the diameter of the jacketed cordage and the particular vulcanizable compound from which the jacket 26 is made, the thickness of the jacket, and the diameter of the mandrel on which the length of cordage is wound. In any event, the indexing wheels of the counter 52 are set so that the motor 45 imparts the number of twists required for the particular cordage being used.

When the counter 52 terminates the twisting of the length of cordage 21, the end thereof is removed from the chuck 35 and is positioned in the clamp 110 provided on the right-hand end of a mandrel 102, which is secured to the end of the shaft 94. Let it be assumed that the lever 82 is actuated to disengage the follower 80 from the thread 65 and the plate 73 moved so as to slide the mandrel 102 to the left when viewed in Fig. 9 and position the clamp 110 adjacent to the chuck 35, while the chuck 35 was rotated to twist the cordage 21. In positioning the end of the twisted cordage in the clamp 110, care is exercised to preserve the previously imparted twist. To secure the end of the cordage in the clamp, the end is passed under the mandrel 102 and then is pressed in the slot 116 so that a portion of the end may be formed around the arcuate groove 115 provided in the periphery of the annular member 111. The portion of the end of the cordage positioned in the groove of the clamp is allowed to unwind so that the conductors 22—22 at the end of the cordage are parallel with each other in order that the jacket 26 may be readily stripped therefrom when desired. When the end is positioned in the arcuate groove 115, the ring 120 is turned in a clockwise direction, when viewed in Fig. 10, so as to clamp the cordage tightly between the bottom of the shallow portion of the groove 115 and the projection 121 provided on the ring 120.

When the end of the cordage is secured in the clamp 110, the push button 242 is actuated to energize the operating coil 240 of the relay 237, which in turn, closes the contacts 236—236 and connects the motor 70 directly to the supply terminals 235—235. This energizes the motor, which, in turn, drives the shaft 61 so that the thread 65 provided thereon, moves the plate 73 laterally away from its normal starting position adjacent to the chuck 35. The shaft 61 also drives the mandrel 102 and the clamp 110 through the gears provided in the housing attached to the plate 73 in a clockwise direction when viewed in Fig. 10, whereby the twisted cordage 21 is wound around the mandrel 102 in the form of the helix 109. The cordage 21 is wound from the under side of the mandrel as it rotates in a clockwise direction in order to form the helix 109 as a right-hand helix. That is, when looking toward the free end of the mandrel, the cordage is wound thereon from left to right, or the cordage proceeds along the mandrel toward the clamp 110 in a direction analogous to that of a right-hand screw thread. The shaft 61 moves the mandrel 102 to the right as the cordage is wound thereon at a rate which causes the individual coils of the helix 109 to lay against each other.

As the mandrel winds the cordage 21 thereon to form the compact helix 109 (Fig. 9), the carriage 145 is moved slowly along the track 146 until the plate 200, carried thereby, actuates the lever 209 of the micro-switch 210, whereby the normally closed contact thereof is opened and denergizes the coil 240 of the relay 237. This causes the contacts 236—236 to open and disconnect the motor 70 from the terminals 233—235. When the carriage reaches this point, the required length of the twisted cordage 21 has been wound on the mandrel 102 to form a complete helix 109 having a predetermined length. The clamp 125, which was slidably positioned on the mandrel 120 throughout the winding operation, is moved to the right when viewed in Fig. 9, until the right-hand face thereof abuts the left-hand end coil of the helix 109 wound on the mandrel. The set screw 113, provided in the clamp, then is turned to lock the clamp in the proper position so that the end of the cordage secured in the chuck 168 may be removed therefrom and clamped in the clamp 125 in the same manner as has been described for the clamp 110. The end of the cordage 21 between the clamp 125 and the chuck 168 is also permitted to unwind so that the jacket may be readily stripped from this end of the cordage when desired.

Having clamped the helix 109 tightly on the mandrel 102, the mandrel is removed from the end of the shaft 94 by sliding the ring 105 to the right, when viewed in Fig. 8, and then withdrawing the mandrel to the left so as to raise the pivotally mounted lever upwardly and out of engagement with the recess 104. The mandrel 102 containing the compact helix 109 (Fig. 9), having the ends thereof clamped securely in the clamps 110 and 125, is placed in a rack, like the racks 230—230 shown in Fig. 14. When a sufficient number of mandrels like the mandrel 102, having a compact helix wound thereon are accumulated to fill the rack 230, the filled racks are inserted in the autoclave 225, and are subjected to sufficient heat therein to cause the jacket 26 of the helically wound cordage 21 to set permanently so as to retain the cordage in its helical shape when the clamps are removed, whereby the length of cordage 21 now appears as the retractile cord 20 (Fig. 11).

It should be noted that the cordage 21 is wound on the mandrel 102 in the same direction as that in which the cordage was twisted. The chuck 35 twists the length of cordage in a clockwise direction, when viewed in Fig. 6, and thereby twists the conductors 22—22 in a right-hand spiral, as shown in Fig. 9. The length of twisted cordage 21 is wound on the mandrel in a clockwise direction to form a right-hand helix 109, when looking at the free end of the mandrel. Because the cordage is wound on the mandrel in the same direction that it was twisted, the twist of the cordage causes the coils of the helix to draw together and remain in a compact helix after it is subjected to heat treatment and removed from the mandrel. The heat treatment of the cordage sets the cordage in its helical shape, but the twist introduced in the cordage causes the helical portion of the retractile cord to resiliently retain its compact helical form upon repeated extension and retraction of the cord 20.

The diameter of the mandrel 102 used in forming the retractile cord 20 is determined by the final diameter that is desired for the retractile cord 20. The cordage 21 must be wound on a mandrel having a diameter which will produce a helix thereon having an outside diameter somewhat smaller than the final diameter of the retractile cord, because, after the compact helix wound on the mandrel 102 is subjected to heat in the autoclave to set the cordage in its helical shape and the clamps 110—110 are removed, the helix unwinds slightly and thereby assumes an outside diameter greater than that at which it was wound on the mandrel 102. This is due to the fact that the heat treatment does not relieve all of the stresses set up in the jacket 26 due to the coiling of the cordage on the mandrel.

At the same time that the helix 109 unwinds on the mandrel when the clamps are removed, the torsional stresses set up in the cordage by twisting the cordage before it was wound on the mandrel tend to draw the individual coils of the helix closely together. Therefore, as the helix 109 unwinds, the torsional stresses set up in the cordage 21 due to the twisting thereof, cause the coils of the helix 109 to draw together, whereby the overall length of the helix 109 assumes a somewhat shorter dimension than that which it had when it was wound tightly on the mandrel. All of these factors are determined by testing and experience in order to obtain a retractile cord 20 having the desired dimensions which render it most favorable for its intended use.

The mere winding of the cordage 21 on the mandrel 102 in compact helical form and subjecting the jacket to sufficient heat to set the jacket 26 so that it will retain the cordage in its helical shape when removed from the mandrel, will not in itself produce the required retractility required for retractile cords. Even though the cordage is wound in a tight helix on the mandrel and given the heat treatment, the helix will not remain in its compact form when it is released from the mandrel. It is the introduction of the twist in the cordage in the same direction in which the cordage is wound on the mandrel that provides the effective retractility in the retractile cord 20. The twisting of the cordage 21 before winding it on the mandrel, sets up torsional stresses tending to form the cordage into helical coils, which are, in a sense, uncontrolled in their formation and would assume the form of knots or kinks in the cordage if the ends were allowed to move together. During the twisting operation the weight connected to the carriage prevents the torsional stresses from forming kinks or knots in the cordage. When the twisted cordage, having the torsional stresses set up therein, is wound helically on the mandrel and is clamped in this position while the jacket is submitted to sufficient heat to set it in its twisted, helical shape, the helically set jacket controls the torsional stresses in the cordage so that they tend to form uniform helical coils in the cordage. Since the jacket is set in a helical form by the heat treatment, the torsional stresses confined therein resiliently urge the individual coils of the helix closely together and thereby increase the retractility of the cord. When a retractile cord, like the cord 20, is manufactured in accordance with the procedures outlined above, the cord produced will retain its helical shape when repeatedly extended and retracted.

The above-outlined procedure may be followed in producing helically wound cords on mandrels by using only one tensioning device 131 including the carriage 145, the track 135 and the weight 147 and performing the winding operation on the mandrel 102 after the twisting operation is completed by the chuck 35. However, there is shown on the drawing a second tensioning device 130, including a carriage 209 adapted to operate in its respective track 207 and a weight 210 for the purpose of increasing the production of retractile cords. In using an apparatus provided with a pair of tensioning devices 130 and 131, the operation would proceed as follows:

A length of the cordage 21 required to make a retractile cord is positioned between the chuck 212 provided on the carriage 209 and the chuck 35 and twisted a predetermined number of times in the manner described above. During the twisting operation, a mandrel 102 is inserted in the end of the shaft 94 preparatory to winding the twisted cordage thereon. The end of the twisted cordage is removed from the chuck 35 and secured in the right-hand clamp 110 provided on the mandrel 102 in the manner described, and the button 242 is actuated to energize the motor 70 and start winding the previously twisted cordage on the mandrel 102. While the motor 70 of the winding device 31 is operating to wind the twisted cordage on the mandrel 102, another length of the cordage 21 required to make a retractile cord is positioned between the chuck 168 of the carriage 145 and the chuck 35 of the twisting device 30 and twisted a predetermined number of times by the chuck 35 as described hereinabove. Figs. 1 to 4, inclusive, illustrate this simultaneous operation of the twisting device 30 with the tensioning device 130 and the winding device 31 with the tensioning device 131.

By the time the carriage 209 reaches the end of its path of travel on its track 207 and actuates its respective sensitive switch 214 to deenergize the motor 70 and terminate the winding operation of the twisted cordage on the mandrel, the second length of cordage is twisted fully. The mandrel 102, having a complete helix 109 wound thereon, is removed from the end of the shaft 194 as described and a second mandrel like the mandrel 102 is connected for rotation therewith. The end of the second length of twisted cordage 21 is removed from the chuck 35 and secured in the clamp 110 positioned on the mandrel. The motor 70 then is energized to rotate the mandrel which winds the length of twisted cordage suspended between the chuck 168 and the clamp 110 thereon as described. While the second length of cordage is being wound on the mandrel, another length of the cordage 21 is withdrawn from the reel 215, and suspended between the chuck 212 and the chuck 35 and twisted. Thus, the twisting and winding devices 30 and 31, respectively, are operated alternately between the carriages 145 and 209 to twist and wind the twisted cordage in a compact helix on the mandrels 102—102. As a result, the number of cords that may be produced by such an apparatus is substantially increased over that which could be obtained by the use of a single tensioning device.

To illustrate the invention more clearly, let it be assumed that retractile cords, like the cord 20 shown in Fig. 11, are to be formed from three-conductor cordage 21, in which the individual conductors 22—22, shown in Figs. 12 and 13, are laid parallel with each other, enclosed in a paper tape, and thereafter the assembly is covered by a neoprene compound which is thereafter cured to form a tough, resilient jacket 26. The cordage 21 has an outside diameter of 0.205 inch and the mandrel on which it is wound has a diameter of 0.25 inch. A supply of the cordage 21 is provided on the reel 215, and the end thereof is withdrawn through the apparatus to the clamp 220 as described. The end of the cordage 21 is secured in the chuck 168 of the carriage 140. The stops 206 and 208 are adjusted on the tracks so that each weight, as it draws its respective carriage to the left-hand end of its track, will withdraw approximately nine feet of the cordage 21 from the reel, that is, at least nine feet of cordage will be suspended between the chuck 35 and the chuck of the particular carriage in use for each twisting operation.

It has been found that an average of seventy-five twists should be introduced into a nine foot length of cordage of the type described to introduce sufficient torsional stresses in the twisted cordage to cause the helical coils of the retractile cord to remain against each other. Therefore, the indexing wheels of the counter 52 are set to deenergize the motor 45 each time it rotates the chuck seventy-five revolutions. The chuck rotates in a clockwise direction when viewed in Fig. 6 and twists the individual conductors 22—22 of the cordage 21 into a long-lay right-hand spiral, as shown in Fig. 9 of the drawings. Only eight feet of the twisted cordage 21 actually is wound on the mandrel, in a compact helix 109, the remaining one foot being secured in the clamps 110 and 125. When eight feet of the cordage has been wound on the mandrel to form the compact helix 109, the helix has a diameter of approximately 0.660 inch and a length of approximately eighteen inches.

The compact helix wound on the mandrel 102 then is placed in the autoclave 226, as described, and is heated at a temperature of about 300° F. for approximately ten minutes to set the cord in its twisted, helical shape. Upon the completion of the heat treatment received in the autoclave, the clamps 110 and 125 are removed from the mandrel, whereby the helix 109 wound thereon is released and allowed to assume its final size and shape indicated by the numeral 19 (Fig. 11). When the helix is released, it unwinds slightly with the result that the final diameter of the helix is approximately 0.750 inch while the overall length of the helix, which originally was eighteen inches between the clamps 110 and 125 on the mandrel, is reduced to approximately eleven inches.

The degree of retractility to be introduced in any retractile cord depends on its use. In the telephone industry the resiliency of the retractile cord is designed to permit the receiver of a telephone instrument to be removed and withdrawn so that it may be used without disturbing the position of the instrument to which the other end of the retractile cord is attached. In cases where the transmitting instrument is firmly secured against movement, the retractility of the cord may be substantially increased without impairing the usefulness of the cord.

What is claimed is:

1. An apparatus for forming cordage having a vulcanized jacket into retractile cords, which comprises a pair of spaced supports for gripping end portions of a length of the jacketed cordage required to make a retractile cord, means for tensioning the length of cordage between the spaced supports, means for rotating one of the supports relative to the other to impart a predetermined twist to the length of cordage, means for winding the twisted length of cordage while under tension into a compact helix having a pitch extending in the same direction as the pitch of the twist imparted to the cordage, and means for holding the helix in its compact helical form on the winding means so that the cordage may be set in its twisted, helical shape.

2. An apparatus for forming cordage having a vulcanized jacket into retractile cords, which comprises means for tensioning a length of such cordage required to make a retractile cord, means for imparting a predetermined twist to the length of cordage, means for winding the twisting length of cordage into a compact helix against the action of the tensioning means, means operable by the tensioning means for terminating the rotation of the winding means when a predetermined amount of the length of cordage is wound thereon, and means for holding the helix in its compact form on the winding means so that the cordage may be set in its twisted, helical shape.

3. An apparatus for forming cordage having a vulcanized jacket into retractile cords, which comprises means for imparting a predetermined twist to a length of the jacketed cordage required to make a retractile cord, winding means positioned transversely to the length of cordage, means for clamping one end of the twisted cordage on the winding means, means for rotating the winding means in such a direction as to wind the length of twisted cordage in a compact helix whose pitch is in such a direction that the twist previously introduced in the cordage tends to force the adjacent turns of the helix closely together, means for tensioning the length of cordage as it is twisted and as it is wound on the winding means to form a helix of uniform diameter on the winding means, and means for moving the winding means transversely with respect to the length of cordage so that the adjacent convolutions of the helix wound thereon abut each other.

4. An apparatus for forming multi-conductor cordage having a vulcanizable jacket into retractile cords, which comprises a reel containing a supply of such cordage, slidable tensioning means attachable to one end of the cordage for withdrawing a length of the cordage from the reel required to make a retractile cord, a rotatable chuck for gripping the opposite end of the length of cordage, said tensioning means serving to hold the withdrawn cordage taut between the chuck and the tensioning means, means for rotating the chuck to impart a predetermined, longitudinal twist to the length of cordage, a mandrel positioned transversely to the twisted cordage, means for clamping one end of the twisted cordage to the mandrel, means for rotating the mandrel in such a direction as to wind the twisted length of cordage against the action of the tensioning means into a compact helix having a pitch in the same direction as the pitch of the twist introduced into the length of the cordage, means for clamping the opposite end of the helix on the mandrel to hold it in its compact helical form so that the vulcanized jacket of the cordage may be set in its helical, twisted form.

5. An apparatus for forming multi-conductor cordage having a vulcanizable jacket into retractile cords, which comprises a rotatable chuck designed to grip one end of a length of such cordage required to form a retractile cord, a clamp slidable longitudinally with respect to said chuck and designed to grip the opposite end of the length of cordage, tensioning means for urging the slidable clamp away from the rotatable clamp to tension the length of cordage between the chuck and the slidable clamp, means for rotating the chuck so as to impart a predetermined longitudinal twist to the length of cordage, a mandrel positioned transversely to the length of cordage and having means for clamping one end thereof to the mandrel, means for simultaneously rotating and moving the mandrel transversely to the cordage to wind the twisted length of cordage in a compact helix against the action of the tensioning means attached to the slidable clamp, and means operable by the slidable clamp for terminating the operation of the mandrel when a predetermined amount of the length of cordage is wound thereon.

6. An apparatus for forming multi-conductor cordage having a vulcanizable jacket into retractile cords, which comprises a rotatable chuck designed to receive one end of a length of cordage required to make a retractile cord, an elongated track having its longitudinal axis substantially aligned with the rotating axis of the chuck, a clamp positioned movably in the track and held thereby against rotation, said clamp being designed to grip the opposite end of said length of cordage, means attached to the clamp for urging the clamp away from the chuck and thereby hold the length of cordage taut between the chuck and the clamp, means for rotating the chuck so as to impart a predetermined longitudinal twist to the length of cordage, a mandrel positioned adjacent to the chuck and transversely to the length of cordage, means for clamping the end of the twisted cordage previously held in the chuck to the mandrel, means for rotating the mandrel in such a direction as to wind the twisted length of cordage on the mandrel in a compact helix against the action of the urging means attached to the clamp, means for moving the mandrel transversely with respect to the cordage so that the adjacent convolutions of the helix abut each other, and means for clamping the end of the cordage previously secured in the clamp to the mandrel to hold the helix on the mandrel so that the wound cordage may be set in its helical, twisted shape.

7. An apparatus for forming multi-conductor cordage having a vulcanizable jacket into retractile cords, which comprises a rotatable chuck designed to grip one end of a length of such cordage required to make a retractile cord, an elongated track having its longitudinal axis aligned with the axis of the chuck, a carriage positioned movably in the track, a clamp mounted on the carriage to grip the opposite end of said length of cordage, means attached to the carriage for urging the carriage away from the chuck to tension the length of cordage between the chuck and the clamp, means for rotating the chuck to impart a predetermined, longitudinal twist to the length of cordage, a mandrel positioned transversely to the length of cordage, means positioned on the mandrel for clamping the end of the twisted cordage previously held in the chuck to the mandrel, means for rotating the mandrel in such a direction as to wind the twisted length of cordage on the mandrel against the action of the tensioning means in a compact helix having a pitch in the same direction as that of the twist imparted to the length of cordage, whereby the torsional stresses resulting from twisting the cordage tend to force the adjacent coils of the helix together, and means positioned on the mandrel for clamping the end of the cordage previously secured in the clamp to the mandrel to hold the helix on the mandrel in its compact form.

8. An apparatus for forming a plurality of individually insulated conductors enclosed in a vulcanized jacket into retractile cords, which comprises a rotatable chuck designed to grip an end of such cordage, a slidable clamp, tensioning means attached to the clamp for holding a length of such cordage required to make a retractile cord under tension between the chuck and the clamp, means for rotating the chuck to twist the cordage in a direction such as to produce torsional stresses in the entire length of cordage, means for terminating the twisting of the cordage when it has been twisted the number of times required for the length of cordage held between the chuck and the clamp, means for winding the twisted cordage into a compact helix against the action of the tensioning means in such a direction that the pitch of the helix is in the same direction as the pitch of the twist previously applied to the cordage, said holding means being designed to create a tension on the cordage sufficient to hold the cordage taut against the action of the torsional stresses set up by twisting the cordage and to cause the cordage to form a helix of uniform diameter as it is formed on the winding means, and means operable by the slidable clamp for terminating the operation of the winding means when a predetermined length of the twisted cordage is wound on the winding means.

9. An apparatus for forming multi-conductor cordage having a vulcanizable jacket into retractile cords, which comprises a rotatable chuck designed to grip one end of a length of such cordage required to form a retractile cord, a clamp movable longitudinally with respect to said chuck and designed to grip the opposite end of said length of cordage, tensioning means for urging the slidable clamp away from the chuck with a force sufficient to hold the said length of cordage taut between the chuck and the slidable clamp, means for rotating the chuck to impart a predetermined, longitudinal twist to the length of cordage, means for winding the twisted length of cordage in a helix against the action of the tensioning means, in such a direction that the twist in the cordage urges the adjacent convolutions of helix together, means for moving the winding means transversely with respect to the length of cordage so that the adjacent convolutions of the helix abut each other, means operable by the movable clamp to render the winding means inoperative when a predetermined length of the cordage is wound in a helix thereon, and means for clamping the helix on the winding means so that the helix may be set in its helical, twisted form when the clamping means are removed from the mandrel.

WILLIAM L. AMES.

REFERENCES CITED

The following references are of record in the file of this patent:

UNITED STATES PATENTS

| Number | Name | Date |
|---|---|---|
| 2,173,096 | Campbell | Sept. 19, 1939 |
| 2,248,149 | Wilson | July 8, 1941 |
| 2,413,715 | Kemp et al. | Jan. 7, 1947 |

Certificate of Correction

Patent No. 2,565,465　　　　　　　　　　　　　　　　　　August 28, 1951

WILLIAM L. AMES

It is hereby certified that error appears in the printed specification of the above numbered patent requiring correction as follows:

Column 9, line 24, for "contact 341" read *contact 241*; column 12, line 11, for "terminals 203" read *terminals 235*;

and that the said Letters Patent should be read as corrected above, so that the same may conform to the record of the case in the Patent Office.

Signed and sealed this 20th day of November, A. D. 1951.

[SEAL]

THOMAS F. MURPHY,
*Assistant Commissioner of Patents.*